United States Patent [19]
Hosonuma

[11] Patent Number: 5,883,163
[45] Date of Patent: Mar. 16, 1999

[54] LIGHT CONDUCTING RESIN PLATE

[75] Inventor: Nobuyuki Hosonuma, Fujisawa, Japan

[73] Assignee: Asahi Kasei Kogyo Kabushiki Kaisha, Osaka, Japan

[21] Appl. No.: 894,439

[22] PCT Filed: Feb. 21, 1996

[86] PCT No.: PCT/JP96/00389

§ 371 Date: Aug. 19, 1997

§ 102(e) Date: Aug. 19, 1997

[87] PCT Pub. No.: WO96/26456

PCT Pub. Date: Aug. 29, 1996

[30] Foreign Application Priority Data

Feb. 22, 1995 [JP] Japan ..................... 7-033766

[51] Int. Cl.$^6$ ..................... C08K 5/34
[52] U.S. Cl. ............. 524/89; 524/97; 524/106; 524/110; 524/94; 524/186; 524/533; 524/535; 524/560; 524/561; 524/310; 524/312; 524/313
[58] Field of Search ............ 526/328.5; 524/313, 524/106, 89, 97, 110, 186, 94, 533, 535, 560, 561, 310, 312

[56] References Cited

U.S. PATENT DOCUMENTS

| | | |
|---|---|---|
| 4,059,916 | 11/1977 | Tachihara et al. . |
| 4,228,267 | 10/1980 | Higashizume et al. ............ 526/328.5 |
| 4,246,382 | 1/1981 | Honda et al. .................. 526/328.5 |
| 4,384,097 | 5/1983 | Wingler et al. ................ 526/328.5 |
| 4,820,757 | 4/1989 | Spang et al. ................... 524/106 |
| 4,937,709 | 6/1990 | Yanagi et al. . |
| 4,998,809 | 3/1991 | Tsuji et al. . |
| 5,040,098 | 8/1991 | Tanaka et al. . |
| 5,074,675 | 12/1991 | Osgood . |
| 5,134,549 | 7/1992 | Yokoyama . |
| 5,622,547 | 4/1997 | Maslowski et al. ............. 524/313 |
| 5,637,632 | 6/1997 | Nozaki ......................... 524/313 |

FOREIGN PATENT DOCUMENTS

| | | | |
|---|---|---|---|
| 3323951 | 1/1985 | Germany | ............ 526/329.5 |
| 57-138601 | 8/1982 | Japan | ................ 526/328.5 |

Primary Examiner—Bernard Lipman
Assistant Examiner—N. Sarofin
Attorney, Agent, or Firm—Birch, Stewart, Kolasch & Birch, LLP

[57] ABSTRACT

A light conducting plate for back lighting which comprises a methacrylic copolymer resin comprising 90 to 99.5% by weight of a methyl methacrylate unit and 0.5 to 10% by weight of an alkyl acrylate unit containing 1 to 8 carbon atoms in the alkyl moiety thereof and having a reduced viscosity of 35 to 60 ml/g in chloroform, the chromaticity of said light conducting plate having x and y color coordinates both ranging from 0.01 to 0.001 as obtained according to JIS-Z-8701.

5 Claims, 1 Drawing Sheet

Thickness 3

Unit: mm

Fig. 3

LIGHT CONDUCTING RESIN PLATE

TECHNICAL FIELD

This invention relates to a light conducting plate for surface lighting having an improved luminance and an improved tone which can be used for back lighting of liquid crystal displays, etc. used in office automation equipment, such as word processors or personal computers, or various monitors of image signals.

BACKGROUND ART

Methacrylic resins are excellent in transparency, weatherability and scratch resistance and are widely used particularly for their transparency as molding materials for optical parts which demand precise molding, such as optical disks and lenses, or for lighting.

Figure 1:
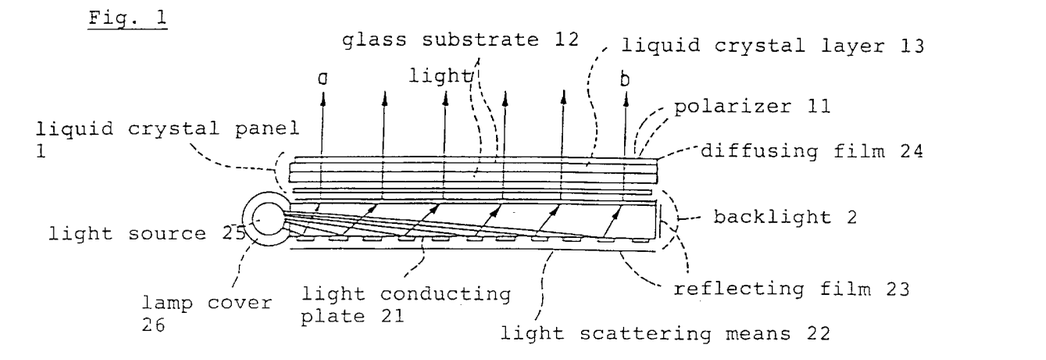
FIG. 1 is a cross section of a liquid crystal display using a side-lighted type surface lighting unit.

The methacrylic resin has recently found use as light conducting plate for back lighting in liquid crystal displays, etc., and the severity of requirements for transparency, color tone and freedom from foreign matter has been increasing. A light conducting plate as herein referred to is a part constituting a side-lighted type surface lighting unit mainly used for back lighting of liquid crystal displays. The side-lighted type surface lighting unit is disclosed in JP-A-57-128383 (the term "JP-A" as used herein means an "unexamined published Japanese patent application"). As shown in FIG. 1, the lighting unit of this type comprises a light source, such as a cold cathode gas discharge tube, a hot cathode gas discharge tube, a light bulb or an LED, placed at the side of a light-emitting surface. The light emitted from the light source enters the light conducting plate from the side, changes its direction by a light scattering means provided on the light-reflecting surface, and comes out through a diffusing film via a polarizer to a viewer side. The light scattering strength of the light conducting plate can be designed appropriately in conformity with the distance from the light source or the position of the reflecting surface so as to provide a uniform surface lighting unit. Because such a side-lighted type surface lighting unit has its light source provided at the side of the light conducting plate thereby to contribute to reduction in thickness and weight of the whole display, it has been recently used as a backlight of liquid crystal displays used in laptop or notebook word processors or personal computers. Since such portable equipment is demanded to work for a long period of time with batteries contained therein, the side-lighted type surface lighting unit used for back lighting is required to have a low power consumption.

In FIG. 1 is shown a schematic illustration of a side-lighted type surface lighting unit used as a backlight of a liquid crystal display. Liquid crystal panel 1 possesses a function of controlling a light transmission at a desired position on the screen thereby forming letter or image information. Since liquid crystal panel 1 per se does not emit light, a backlight 2 is needed for obtaining a clear image. As light source 25, a cold cathode fluorescent tube which consumes relatively low power of electricity and yet provides sufficient brightness is of frequent use.

Light conducting plate 21 is a transparent resin plate having provided light-scattering means 22 on the light-reflecting surface thereof. Light-scattering means 22 is formed by injection molding using a mold having a prescribed pattern or by applying a white ink to the light-reflecting side with gradation by, for example, printing. Light conducting plate 21 can have a flat shape as with the case of FIG. 1, a wedge shape having a thickness decreasing with the distance from the light source, and other special irregular shapes. Numeral 23 is a reflecting film which functions to reflect light having passed through light conducting plate 21 to a viewer side thereby to improve light utilization. Numeral 24 is a frosted glass-like cloudy film called a diffusing film. Since light-scattering means 22 has a dot or stripe pattern, diffusing film 24 is effective to prevent such a pattern from being seen through liquid crystal panel 1. At the same time, a surface lighting unit which scatters light uniformly can be obtained by blurring the pattern by diffusing film 24. Numeral 26 is a lamp cover, which is used for efficiently leading light emitted from light source 25 into light conducting plate 21. The arrows in FIG. 1 indicate the light proceeding direction.

Thus, a light conducting plate is set on the back side of a liquid crystal panel and used in a shielded state, little light from the outside is let in.

With the recent spread of color and/or wide liquid crystal displays, the demand for a surface lighting unit achieving uniform light emission at a high luminance and with freedom from unevenness in luminance or color has been increasing. To meet this demand a large number of techniques have ever been disclosed.

For example, light conducting plates having provided unevenness so as to increase the amount of scattered light with the distance from the light source are disclosed in (1) JP-A-U-61-157986 (the term "JP-A-U" as used herein means an "unexamined published Japanese utility model application"), (2) JP-A-U-62-87315, (3) JP-A-U-63-43186, (4) U.S. Pat. No. 4,059,916, (5) U.S. Pat. No. 4,937,709, (6) U.S. Pat. No. 5,134,549 and (7) JP-A-U-5-79537. A technique for molding such a light conducting plate is disclosed in (8) JP-A-4-52286, in which a mold having a prescribed pattern formed by photoetching is used. (9) JP-A-2-165504 and (10) U.S. Pat. No. 5,074,675 disclose a light conducting plate which increases the amount of scattered light with the distance from the light source, in which the surface at the bottom facing the light-emitting surface is provided with grooves having a specific section designed to efficiently reflect the light from the light source to the viewer side, and the interval and the depth of the grooves increase with the distance from the light source so as to increase the amount of scattered light accordingly. Further (11) JP-A-U-60-94605, (12) U.S. Pat. No. 4,998,809 and (13) U.S. Pat. No. 5,040,098 disclose a technique for achieving both reductions in thickness and weight and increase in luminance, which comprises forming light-scattering grooves on the bottom surface facing the light-emitting surface and shaping the light conducting plate itself into a wedge having its thickness decreased with the distance from the light source.

In addition, it has been proposed to disperse light-scattering particles in the inside of a transparent light conducting plate as described in (14) JP-B-39-1194 (the term "JP-B" as used herein means an "examined published Japanese patent application"), (15) JP-A-53-36199, (16) JP-A-54-105562 and (17) JP-A-U-56-58678. In this connection, (18) JP-A-2-221924 and (19) JP-A-2-221925 disclose a process for producing a light conducting plate in which light-scattering particles are non-uniformly distributed by taking advantage of a difference in rate of precipitation.

The above-cited patent and utility model publications have a mention that the materials suitable as light conducting plate include glass, methacrylic resins, styrene resins, polycarbonate resins, and the like, but give no particulars on the characteristics required of such transparent materials.

With respect to resins for optical disks, various techniques for obtaining a transparent methacrylic resin suffering from little discoloration have been proposed. For instance, (20) JP-B-7-132598 discloses a technique for obtaining a colorless and transparent methacrylic resin having a high optical purity by specifying the molecular weight, pyrolysis index and yellowness index of a methacrylic resin and the volatile content and fine foreign matter content in the resin.

In high-speed molding of thin-walled articles, silver streaking often occurs due to volatile components of a resin, such as the monomer or the water content. In order to minimize the volatile content of a resin as a countermeasure for silver streaks, it has been a practice to remove the volatile matter in high vacuum at the time of extrusion and pelletization. (21) JP-A-58-154751 describes that active reduction of the monomer content in a resin is effective to suppress occurrence of silver streaks.

To the contrary, there is a mention, e.g., in (22) JP-A-3-259439 and (23) JP-A-4-253752 that existence of some amount of volatile components in a resin is effective for suppression of silver streaking on molding.

On the other hand, it has been proposed to add a stabilizer to a methacrylic resin to prevent pyrolysis, thermal discoloration or oxidation discoloration as disclosed in JP-A-59-15444, JP-A-4-216806, and JP-B-57-9392.

Nevertheless, none of the above-described techniques is to solve the discoloration problem observed in a light conducting plate made of a methacrylic resin by injection molding, i.e., to eliminate luminance unevenness or color unevenness in a side-lighted type surface lighting unit.

Characteristics generally required of materials for light conducting plates include high transmission, colorlessness, freedom from foreign matter, high heat resistance, and, in the case of injection molding, satisfactory moldability and satisfactory mold release properties. Specifically, the materials include such transparent materials as glass, methacrylic resins, styrene resins, and polycarbonate resins. Actually methacrylic resins which have excellent optical characteristics and are lighter than glass are used frequently.

In recent years inexpensive mass production of a light conducting plate by injection molding has prevailed as a reflection of the drastic increase of demand of laptop or notebook word processors or computers. As to the form of a light conducting plate, a thin wedge type is increasing for the purpose of minimizing power consumption.

While a methacrylic resin has excellent transparency and thereby exhibits satisfactory performance as light conducting plate, the requirement for further improvement in transparency has been getting more strict according as full color liquid crystal displays are spreading. Compared with conventional lighting units, a light conducting plate has a very long length through which light should pass so that only slight coloration of the material causes color unevenness.

Referring to FIG. 1, since light ray $a$, which is reflected near the light source, has passed through the material over a relatively short distance, it is insusceptible to the influence of the color of the material and is emitted toward a viewer side as having a color near to the light source's. On the other hand, light ray $b$, which is emitted from the position far from the light source, is susceptible to the influence of the color unevenness of the material and tends to assume a different color from that of the light source while it is passing through the material over a long distance. It follows that the color of scattered light of a surface lighting unit varies within the same light emitting surface depending on the distance from the light source, which leads to color unevenness.

Taking, for instance, a 3 mm thick plate produced by general injection molding of a methacrylic resin having a sufficiently increased purity, the yellowness index (YI) in the transmission direction is about 0.7 to 1, which means satisfactory transparency giving rise to no problem in usual use. However, if a similarly injection molded article has a light pass length exceeding 220 mm, a delicate color of the material itself would be accumulated, sometimes reaching the yellowness index of about 5. If a material having such a yellowness index is used as a light conducting plate of a side-lighted type surface lighting unit, the yellowness becomes stronger with the distance from the light source, resulting in color unevenness as a whole. In particular, this would be a cause of reduction in color reproducibility in a full color liquid crystal display. It is desirable for a full color liquid crystal display to have a backlight whose color unevenness is within a range of from 0.001 to 0.005 as expressed in terms of a difference between the maximum and the minimum on both x and y chromaticity coordinates according to a CIE calorimetric system. It is more desirable, as a matter of course, that no change occurs on both x and y coordinates.

In order to eliminate such yellowing, improvement in tone by color toning has been attempted. For example, a method called bluing consisting in addition of a blue pigment has been widely employed to correct the above-described delicate yellowness. Although this method produces an effect of reducing color unevenness due to yellowing, it involves reduction in transmission. Therefore, application of the bluing technique to a light conducting plate results in reduction of light utilization (i.e., reduction of luminance). There is a method for tone improvement which comprises adding a milky white pigment, such as titanium oxide, and a fluorescent brightening agent to a methacrylic resin to be used as a cover of a fluorescent tube. However, a light conducting plate made of such a milky white material not only causes excessive light scattering in the vicinities of the light source, leading to local excessive brightness, but also fails to transmit light to the part far from the light source. As a result, light emitted from the light conducting plate becomes non-uniform. Thus, materials for light conducting plates must be transparent as stated above.

As another approach to an improved luminance, a method of incorporating a fluorescent brightening agent alone into a methacrylic resin has been suggested, as disclosed in (24) JP-A-62-32488 and (25) JP-A-64-42686, in which fluorescence excited by ultraviolet rays emitted from a light source is utilized for improvement of luminance. This method is deemed to be unsuitable for improving luminance unevenness and color tone because a blue tint becomes strong, depending on the intensity of the ultraviolet light of the fluorescent tube. Addition of a fluorescent brightening agent to a transparent resin for a fluorescent tube cover is disclosed in (26) JP-B-6-3682. This method aims at cutting the ultraviolet light of a fluorescent tube and produces no effect on the subject matter of the present invention, improvement of tone or light utilization. In other words, the method has no effect of converting incident light in the ultraviolet region to light in the visible region.

Accordingly, an object of the present invention is to eliminate discoloration of an injection molded methacrylic resin light conducting plate, that is, to increase the luminance, to eliminate luminance unevenness and to improve color tone of a side-lighted type surface lighting unit.

Methacrylic resins are used as material for light conducting plates for their superiority in transparency to other molding materials. With reference to resins for optical disks, (20) JP-B-7-132598 states that a colorless and transparent methacrylic resin having a high optical purity can be obtained by specifying the molecular weight, pyrolysis index and yellowness index of a methacrylic resin and the volatile content and fine foreign matter particle content in the molding material. However, where a light conducting plate is produced by injection molding, the methacrylic resin disclosed is still insufficient. That is, the resin tends to undergo pyrolysis, thermal discoloration or oxidation discoloration during molding by the influences of the temperature distribution in an injection cylinder, the shape of the cylinder, and entrained air oxygen from the hopper, etc., only to provide colored light conducting plates. From this standpoint, the aforesaid method concerning a molding resin for optical disks which comprises actively reducing the monomer content in a molding resin, as suggested in (21) JP-A-58-154751, is not favorable because of involvement of the influence of oxygen due to entrainment of air on feeding from a hopper, etc. The effect of the aforesaid technique of (22) JP-A-3-259439 and (24) JP-A-4-253752, which comprises incorporating volatile components into a resin to some extent, resides in inhibition of silver streaks during molding and differs from the inhibitory effect on discoloration as aimed in the present invention.

Variations of the size or kind of a molding machine, the screw design, and other molding conditions make it technologically difficult to completely control heat generation, air entrainment, etc. of a resin through some mechanical means.

The above-described addition of a stabilizer to a methacrylic resin to prevent thermal discoloration or oxidation discoloration thereby to improve the tone of a light conducting plate, as proposed in JP-A-59-15444, JP-A-4-216806, and JP-B-57-9392, is insufficient in effect and rather brings about coloration.

As has been reviewed, the conventional techniques fail to provide a colorless transparent light-conducting plate by injection molding, i.e., a surface scattering lighting unit which satisfies the requirements demanded for use as a backlight of color liquid crystal displays, namely, high luminance, freedom from color unevenness, and uniform light transmission and scattering.

In order to obtain a high luminance and colorless light conducting plate it is necessary to specify the molecular weight of a methacrylic resin to be used and to inhibit coloration due to thermal oxidation on injection molding.

In order to obtain a light conducting plate having a small thickness and a precise uneven pattern by injection molding it is necessary to improve fluidity of an acrylic resin. To this effect, it is a generally followed technique to reduce the molecular weight of a resin or to copolymerize a comonomer having an internal plasticizing action. A resin having a merely increased comonomer content, while exhibiting improved fluidity, has reduced heat resistance and is unsuitable. A resin having a merely decreased molecular weight, while exhibiting improved fluidity, has poor mechanical strength.

An acrylic resin exhibits relatively strong adhesion to metal. If the adhesion to an injection mold is too strong, the molded article suffers from defects such as cracks, breaks, or surface roughness, upon release from the mold. Injection molding into a light conducting plate is desirably carried out at as low a molding temperature as possible in order to prevent deterioration of tone due to the foreign matter or to prevent thermal discoloration. However, fluidity of a molding resin in a mold would be reduced at low molding temperatures, which necessitates increase of the injection pressure to avoid short molding. As a result, the adhesion between a molded article and a mold becomes stronger, giving rise to the aforesaid problem of cracking. Accordingly, in order to achieve low-temperature molding, improvement of fluidity of the resin is required. However, excessive molecular weight reduction for improving the fluidity leads to reduction in mechanical strength, which causes cracking on release from a mold. In other words, in order to obtain a thin light conducting plate by injection molding at a possible lowest temperature, it is preferable to specify the molecular weight of a methacrylic resin to be used and to improve release properties of the resin.

Known techniques for improving the release properties of acrylic resins include addition of at least one of a polyhydric alcohol fatty acid ester, a monohydric alkyl alcohol, a fatty acid, a fatty acid amide, and a fatty acid metal salt (JP-A-61-73754), addition of a glycerol higher fatty acid ester and a saturated aliphatic alcohol (JP-A-1-294763), addition of at least one of glycerol stearate, glycerol behenate, and a fatty acid alkyl ester (JP-A-2-115255), and addition of a glycerol higher fatty acid ester whose alkyl moiety has a specific carbon atom number distribution (JP-A-4-53860 and JP-A-4-253752). The resin compositions disclosed still have insufficient fluidity or release properties or exhibit low heat resistance for use as resins for light conducting plates.

Accordingly, another object of the present invention is to solve such problems as poor mechanical strength (warpage or cracks on release) and poor appearance (e.g., silver streaks) as well as unevenness in color and luminance due to discoloration.

DISCLOSURE OF THE INVENTION

The inventors have conducted extensive study to solve the above-described problems and reached the present invention.

The present invention relates to a light conducting plate for back lighting which comprises a methacrylic copolymer resin comprising 90 to 99.5% by weight of a methyl methacrylate unit and 0.5 to 10% by weight of an-alkyl acrylate unit containing 1 to 8 carbon atoms in the alkyl moiety thereof and having a reduced viscosity of 35 to 60 ml/g in chloroform, the chromaticity of the light conducting plate having the difference between the maximum and the minium of x and y color coordinates of the light emitting surface of from 0.001 to 0.005 as obtained according to JIS-Z-8701.

More specifically, the invention relates to a light conducting plate for back lighting characterized in that the above-mentioned methacrylic copolymer resin contains not more than 5000 fine particles having a particle size of 0.5 to 25 $\mu$m per gram and contains 1000 to 5000 ppm of at least one volatile component having a boiling point of 80° to 150° C. at atmospheric pressure and a solubility parameter of 7 to 10 $(cal/cm^2)^{1/2}$.

The present invention further relates to a light conducting plate for back lighting which comprises a methacrylic copolymer resin containing 0.1 to 10 ppm of a wavelength converting agent.

More specifically, the invention relates to a light conducting plate for back lighting characterized in that the methacrylic copolymer resin contains 0.1 to 10 ppm of at least one wavelength converting agent selected from a bisbenzoxazole compound, a pyrazoline compound, a coumarin compound, an imidazoline compound, a benzidine compound, a naphthalimide compound, and a diaminostilbenedisulfonic acid compound.

The present invention furthermore relates to a light conducting plate for back lighting, which comprises a methacrylic resin composition comprising 100 parts by weight of a methacrylic copolymer resin, 0.01 to 0.2 part by weight of a glycerol higher fatty acid ester represented by formula (1):

wherein $R_1$ represents an alkyl or hydroxyalkyl group containing an odd number of carbon atoms of from 11 to 25; and $X_1$ and $X_2$ each represent a hydrogen atom or —C(=O)$R_1$, or of a higher fatty acid, and 0.01 to 0.5 part by weight of a higher aliphatic alcohol, the composition having a water content of 1 to 800 ppm.

More specifically, the invention relates to a light conducting plate comprising the above-mentioned methacrylic resin composition in which the glycerol higher fatty acid ester is a compound represented by formula (1) wherein $X_1$ and $X_2$ both represent a hydrogen atom and the ratio of an alkyl moiety having 17 carbon atoms to the total alkyl moieties is 80 to 99%.

The present invention still further relates to a light conducting plate for back lighting, which comprises the above-described methacrylic resin composition in which the higher fatty acid is 0.01 to 0.2 part by weight of lauric acid and the higher aliphatic alcohol is 0.01 to 0.5 part by weight of stearyl alcohol.

The present invention yet further relates to a light conducting plate for back lighting, which comprises the above-described methacrylic resin composition which is characterized by containing 0.1 to 10 ppm of a wavelength converting agent.

More specifically, the invention relates to a light conducting plate for back lighting characterized by containing 0.1 to 10 ppm of a wavelength converting agent selected from a bisbenzoxazole compound, a pyrazoline compound, a coumarin compound, an imidazoline compound, a benzidine compound, a naphthalimide compound, and a diaminostilbenedisulfonic acid compound.

The present invention is explained in detail below.

The methacrylic copolymer resin used in the invention can be prepared by continuous solution polymerization as follows.

A monomer mixture comprising 90 to 99.5% by weight of methyl methacrylate unit and 0.5 to 10% by weight of an alkyl acrylate unit having 1 to 8 carbon atoms in the alkyl moiety thereof is prepared. The monomer mixture is mixed with 10 to 25% by weight of an inert polymerization solvent, 0.001 to 0.003% by weight of a free radical generating catalyst, and 0.1 to 0.5% by weight of a chain transfer agent, each amount being based on the total reaction mixture.

The inert polymerization solvent is selected from those capable of controlling the molecular weight of the resin produced within a prescribed range. Preferred polymerization solvents include ethylbenzene and methyl isobutyl ketone, with ethylbenzene being particularly preferred. The solvent is used in an amount of 10 to 25% by weight of the total reaction mixture. If the amount of the solvent is less than 10% by weight, the polymerization system is too viscous, making it difficult to control the reaction system. If it exceeds 25% by weight, the load of solvent removal drastically increases, which is technologically unfavorable.

The radical generating catalyst as above referred to means a polymerization initiator generating a free radical. Useful catalysts include organic peroxides, such as benzoyl peroxide, azo compounds, such as azobisisobutyronitrile, and peroxides such as lauroyl peroxide and t-butylperoxy 2-ethylhexanoate. When polymerization is carried out at high temperatures of 90° C. or higher, azo compounds or peroxides whose 10-hour half-value period temperature (temperature at which the half-value period is 10 hours) is 80° C. or higher and which are soluble in the monomer mixture or the solvent used are preferred. Examples of such compounds are 1,1-bis(t-butylperoxy)-3,3,5-trimethylcyclohexane-t-butyl peroxide, 2,5-dimethyl-2,5-di(benzoylperoxy)hexane, 1,1-azobis(1-cyclohexanecarbonitrile), and 2-(carbamoylazo)isobutyronitrile. 3,3,5-Trimethylcyclohexane-di-t-butyl peroxide is particularly preferred. The free radical generating catalyst is used in an amount of 0.001 to 0.003% by weight based on the total reaction mixture.

The chain transfer agent to be used preferably includes mercaptans, especially n-butylmercaptan, n-octylmercaptan, n-dodecylmercaptan, and 2-ethylhexyl thioglycolate. The chain transfer agent is added to the monomer mixture in a concentration of 0.1 to 0.5% by weight so that the resulting methacrylic copolymer may have a reduced viscosity of 35 to 60 ml/g in chloroform at 25° C.

Then inert gas is introduced into the thus prepared monomer solution to reduce the dissolved oxygen concentration to 1 ppm or lower. If the dissolved oxygen concentration exceeds 1 ppm, colorlessness and transparency of the resulting resin are impaired. While the method for reducing the dissolved oxygen to 1 ppm or less is not particularly restricted, it is preferred that the monomer solution is continuously fed to a countercurrent contact tower and brought into countercurrent contact with an inert gas, e.g., nitrogen, to drive out dissolved oxygen into the inert gas stream by making use of gas-liquid equilibrium to thereby remove dissolved oxygen effectively.

After dissolved oxygen is reduced to 1 ppm or less, it is necessary to filter the monomer solution through a filter having a pore size of 0.5 $\mu$m or smaller. Enflon Filter MCY4463FRE, produced by Pole Co., can be mentioned as a preferred example of suitable filters. The monomer solution having passed through such a filter will provide a polymer containing not more than 5000 fine particles whose size is from 0.5 to 25 $\mu$m per gram as measured with a particle counter. A methacrylic copolymer resin containing more than 5000 such fine particles causes an appreciable transmission loss and also suffers coloration.

After reduction of dissolved oxygen and removal of fine foreign matter particles, the monomer solution is continuously fed to a reaction zone and subjected to polymerization at a temperature ranging from 120° to 160° C. If the polymerization temperature is lower than 120° C., the reaction rate is too low in practice. If it exceeds 160° C., too high a reaction rate makes it difficult to control the polymerization conversion or causes side reactions and/or coloration of the product.

In the present invention, removal of volatile component from the reaction product can be conducted by heating the product at 200° to 290° C. to remove the most of volatile components and then feeding the residue toga tank kept under reduced pressure to further reduce the volatile components.

Where a specific volatile component is added to the resulting copolymer as hereinafter described, the addition can be performed by, for example, a method of adding the volatile component to the copolymer followed by kneading and extruding or a method of adding the volatile component at the melting point of the copolymer followed by kneading and extruding. Commonly employed apparatus, such as a Banbury mixer, a roll and an extruder, can be used for kneading and extrusion.

The methacrylic copolymer resin used in the invention is a copolymer comprising a methyl methacrylate main unit and a copolymerizable monomer unit (comonomer unit) and is a thermoplastic molding material. The comonomer unit preferably includes a methyl acrylate unit, an ethyl acrylate unit, a butyl acrylate unit, an isopropyl acrylate unit, a 2-ethylhexyl acrylate nit, a cyclohexyl methacrylate unit, and a t-butylcyclohexyl methacrylate unit.

The comonomer unit is preferably present in the copolymer in a proportion of 0.5 to 10% by weight, still preferably 0.5 to 8% by weight. If the proportion of the comonomer unit is less than 0.5% by weight, the resin undergoes vigorous pyrolysis while molded. If it exceeds 10% by weight, serious reduction in heat distortion temperature can result. The molecular weight of the copolymer, as expressed in terms of reduced viscosity measured in chloroform at 25° C., is preferably 35 to 60 ml/g, still preferably 40 to 60 ml/g. If the viscosity is less than 35 ml/g, the molded article has insufficient strength and is apt to break. If it exceeds 60 ml/g, the resin has considerably reduced processability, such as injection moldability and extrudability, due to insufficient fluidity.

The number of fine particles of foreign matter having a particle size of 0.5 to 25 µm which are present in the methacrylic copolymer resin of the invention is preferably not more than 5000, still preferably not more than 3000, per gram. It is also preferable that the resin of the invention contains 1000 to 5000 ppm, particularly 1000 to 3000 ppm, of at least one volatile component having a boiling point of 80° to 150° C. at atmospheric pressure and a solubility parameter of 7 to 10 $(cal/cm^2)^{1/2}$. Such presence of a volatile component has an effect of reducing the oxygen partial pressure in an injection molding machine, especially in a plasticizing zone underneath the hopper. The same effect may be obtained by displacing the internal atmosphere of an injection molding machine with nitrogen. The methacrylic copolymer resin having these preferred properties provides a light conducting plate with improved tone with ease (in good yield).

The methacrylic resin composition for light conducting plates according to the invention comprises 100 parts by weight of the above-described methacrylic copolymer resin, 0.01 to 0.2 part by weight, more preferably 0.01 to 0.1 part by weight, of a glycerol higher fatty acid ester represented by formula (1) or a higher fatty acid, and 0.01 to 0.5 part by weight, more preferably 0.01 to 0.3 part by weight, of a higher aliphatic alcohol, and has a water content of 1 to 800 ppm, more preferably 1 to 400 ppm. The higher fatty acid glycerol monoester is the compound represented by formula (1) and includes glycerol monolaurate, glycerol monomyristate, glycerol monopalmitate, glycerol monostearate, and glycerol monobehenate. These esters may be used either individually or as a mixture of two or more thereof. Particularly excellent release properties can be secured by using highly pure glycerol monostearate of formula (1) in which the carbon atom number of the alkyl moiety $R_1$ is from 10 to 30, and the ratio of alkyl moieties having 18 carbon atoms to the total alkyl moieties is 80 to 99%; lauric acid as a higher fatty acid: and stearyl alcohol as a higher aliphatic alcohol. If the contents of the glycerol higher fatty acid monoester or higher fatty acid and higher aliphatic alcohol are less than 0.01 part by weight, the effect of improving release properties of the methacrylic copolymer resin is insufficient. Even if the glycerol higher fatty acid monoester or higher fatty acid content exceeds 0.2 part by weight, or the higher aliphatic alcohol content exceeds 0.05 part by weight, no appreciable further effect on release properties can result. Besides not paying, too much addition of the release agents induces increase in yellowness or reduction in heat resistance of the resin composition. Moreover, part of the release agents added would be precipitated on the surface of a mold or die lips, which causes surface defects of molded articles. If the water content of the methacrylic resin composition exceeds 800 ppm, the release effect of the glycerol higher fatty acid monoester is impaired probably because of hydrolysis. Reduction of the water content to 1 ppm or less is practically difficult. In order to reduce the water content to 800 ppm or less, drying conditions should be controlled strictly, but the drying manner itself is conventional.

In another aspect of the present invention, the inventors have found that a light conducting plate having an improved tone and an increased light utilization thereby exhibiting a high luminance can be obtained by adding a prescribed amount of an ultraviolet wavelength converting agent.

Where a wavelength converting agent is added to a methacrylic resin according to common usage, it absorbs sunlight or fluorescent tube light containing much ultraviolet light and confines the generated light inside the molded article so that the molded article assumes a bluish tone. On the contrary, because a light conducting plate is set on the back of a liquid crystal panel, most of the outside light is shut out. In addition, a fluorescent tube whose light contains relatively less ultraviolet light is placed by the side as a light source. Under such a situation of use, the wavelength converting agent brings about a moderate improvement in tone of the methacrylic resin material to provide a light conducting plate free from color unevenness.

The wavelength converting agent which can be used in the invention is preferably chosen taking heat resistance, light resistance and compatibility into consideration. Examples of preferred wavelength converting agents are shown below.

Bisbenzoxazole Compounds:
Ex.

(4,4'-bis[5-methy-2-obenzoxazolyl]stilbene)

-continued (2,5-bis[5'-t-butylbenzoxazolyl(2)thiophene])

Pyrazoline Compounds:
Ex.

Coumarin Compounds:
Ex.

Imidazolone Compounds:
Ex.

Benzidine Compounds:
Ex.

Naphthalimide Compounds:
Ex.

Diaminostilbenedisulfonic Acid Compounds:
Ex.

The wavelength converting agents may be used either individually or as a combination of two or more thereof.

Methacrylic resin materials undergo deterioration and yellowing by trace oxygen contained therein in a processing step involving heat, such as an injection molding step. The yellowness is accounted for as an optical phenomenon arising from a reduction in transmission of short wavelength (400 to 500 nm) light. The wavelength converting agent used in the invention is capable of absorbing ultraviolet light imperceptible by human eye and releasing it as converted to blue light of different wavelength, thereby compensating for the loss of visible light of short wavelength due to the yellowness and thus correcting the color unevenness. This effect can be taken advantage of only in use in a light conducting plate used as a backlight of liquid crystal displays. If used for a light source containing more ultraviolet light such as sunlight, the wavelength converting agent would make the methacrylic resin material appear blue-tinged.

The wavelength converting agent is preferably added to the methacrylic resin in an amount of 0.1 to 10 ppm. If the amount is less than 0.1 ppm, the hue improving effect is insufficient. If it exceeds 10 ppm, the degree of bluing is too strong in the vicinities of a light source, which rather results in enhancement of color unevenness. A still preferred amount to be added is 0.2 to 5 ppm. While the manner of addition of the wavelength converting agent is not particularly limited as far as the agent can be dispersed uniformly in the methacrylic resin, it is recommended to add the agent as diluted with an appropriate dispersant to facilitate dispersing. For example, dicyclohexyl phthalate can be used as dispersant for the above exemplified 2,5-bis[5'-t-butylbenzoxazolyl(2)]thiophene. The wavelength converting agent can be incorporated into a methacrylic resin by, for example, adding the agent to a monomer mixture to be polymerized or by melt-kneading a previously prepared methacrylic resin together with the agent followed by pelletizing. A powdered wavelength converting agent may be dry blended with methacrylic resin pellets. In the case where the methacrylic resin is prepared by solution polymerization, a mixture of monomers, the wavelength converting agent and a dispersant may previously-be dissolved in a solvent, such as an aromatic hydrocarbon, to prepare a monomer solution. In the case of bulk polymerization, a mixture of monomers and an initiator is continuously fed to a polymerization vessel kept at a temperature of 100° to 200° C. to initiate polymerization.

If desired, known additives, such as lubricants, antioxidants and antistatic agents, can be added to the methacrylic resin composition as long as the characteristics of the composition are not impaired. Cares should be taken, however, the amount of these additives be minimized because the additives tend to color the molded article to impair color reproducibility. While methacrylic resins generally contain an ultraviolet absorber for improving light resistance, it is recommended in the invention that addition of an ultraviolet absorber be avoided because absorption of ultraviolet light which will serve as energy for fluorescence emission means failure of manifestation of the expected effect.

More specifically, there is obtained a surface lighting unit for back lighting having a methacrylic resin light conducting plate with an improved tone, in which the difference between the maximum and the minimum of x and y color coordinates of the light emitting surface is within 0.001 to 0.005, particularly 0.001 to 0.003.

BEST MODES FOR CARRYING OUT THE INVENTION

The present invention will now be illustrated in greater detail by way of Examples, but the invention should not be construed as being limited thereto.

Various analyses and evaluation of physical properties for copolymers and compositions prepared were carried out according to the following methods.

(1) Measurement of Volatile Content in Copolymer:

An aliquot of the resin composition prepared is dissolved in dichloromethane and analyzed by gas chromatography.

(2) Reduced Viscosity:

A sample weighing 0.15 g is dissolved in 50 ml of chloroform, and the reduced viscosity is measured with an Ostwald viscometer at 25° C.

(3) Measurement of Fine Particles:

A sample weighing 5 g is dissolved in 30 ml of dichloroethane. The solution is irradiated with a laser beam, and the scattering of the laser beam is detected to obtain the number of fine particles of 0.5 to 25 μm with a previously corrected particle counter (Model 346BCL, manufactured by HIAIC-ROYCO Co.).

(4) Solubility Parameter (SP):

*Polymer Handbook*, 2nd Ed., A. Willy Interscience Publication Inc. is referred to. For those not mentioned in the reference book, SP is calculated according to the following Small's formula using a molecular affinity constant G.

$$\text{Solubility Parameter} = d \cdot \frac{\Sigma G}{M}$$

(5) Water Content:

Measured with a Karl Fischer water content meter (manufactured by Kyoto Denshi K. K.).

(6) Mold Release Properties:

A resin material is injection molded using an injection molding machine T-100D (manufactured by Fanuc Ltd.) under conditions of 230° to 250° C. in cylinder temperature, 50° C. in mold temperature, and 80 MPa in maximum injection pressure, into a cup mold for release testing. Release properties is evaluated by measuring the stress on release (release force) by means of a load cell CMX200 (manufactured by Orientec Co., Ltd.) which is set between the ejector pin plate and an ejector load.

(7) Heat Distortion Temperature (HDT):

HDT, indicative of heat resistance, is measured in accordance with ASTM-D648. Before testing, a test piece is annealed at 96° C. for 2 hours and then conditioned at 23° C. and 52% RH for 48 hours.

(8) Melt Flow Index (MFI):

MFI (g/10 min) is measured in accordance with ASTM-D1238, method I (230° C., 3.8 kg) as a measure of moldability.

Figure 2:
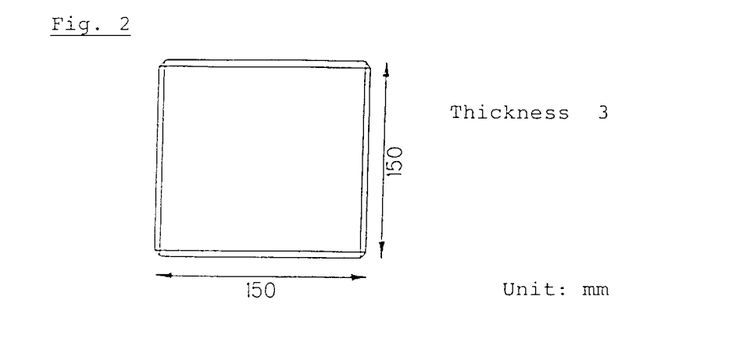
FIG. 2 is a schematic plane view of a light conducting plate to be used in a side-lighted type surface lighting unit for evaluation of color coordinates.
Figure 3:
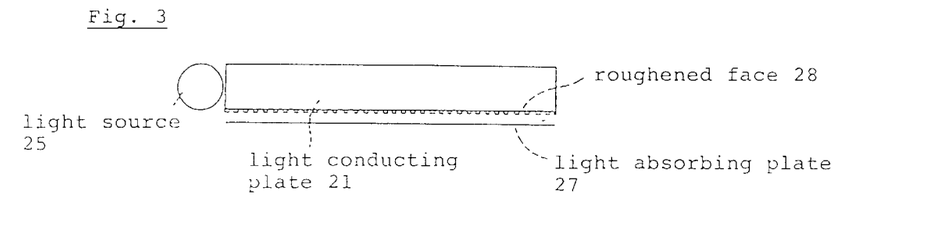
FIG. 3 is a cross section of a side-lighted type surface lighting unit for evaluation of color coordinates.

(9) Assembly of Side-lighted Surface Lighting Unit:

Pellets having been dried at 90° C. for 3 hours are injection molded into a plate of 100 mm×100 mm×2 mm using an injection molding machine AUTOSHOT T-100D produced by Fanuc Ltd. at a molding temperature of 230° to 250° C., a mold temperature of 80° C. and a maximum injection pressure of 70 MPa. A great number of conical pits are dug over an area of 40 mm×85 mm on one side of the molded plate by means of a numeral control engraving machine to prepare a light conducting plate with a light scattering means as shown in FIG. 2. The pit depth is continuously varied from 0.07 mm to 1.16 mm along the light proceeding direction so that the diameter of the base of the cone may continuously increase from 0.5 mm to 1.1 mm. The pits are arrayed in a lattice pattern at a pitch of 1.3 mm. The resulting light conducting plate is substituted for that of the side-lighted type surface lighting unit (LM64P10, manufactured by Sharp Corporation) of a commercially available word processor. The above side-lighted type surface lighting unit comprises a fluorescent tube as a light source, a lamp cover surrounding the light source, a diffusing film, a reflecting film, a frame for fixing these members, and a reflecting frame (a white frame for effective utilization of light). All these members are used as they are. An inverter CKA-M10L-L manufactured by TDK Corporation is connected to the electrode of the fluorescent tube to assemble a side-lighted type surface lighting unit, which emits light on supplying electric power of 12 V from a direct current stabilizing power source unit (PAB32-3 manufactured by Kikusui Denki K. K.) via the inverter. The cross section of the resulting side-lighted type surface lighting unit is shown in FIG. 3.

(10) Evaluation of Chromaticity Coordinates (JIS Z8701):

An apparatus for measuring liquid crystal color distribution (CA-1000 produced by Minolta Camera Co., Ltd.) is set in front of the side-lighted type surface lighting unit at a distance of 40 cm from the light emitting surface in a dark room. The lighting unit is switched on and kept lighting for 30 minutes to stabilize the luminance of the fluorescent tube. The luminance of the whole light emitting surface and the chromaticity coordinates (x and y color coordinates obtained from tristimulus values X, Y and Z as measured according to JIS Z8701) are measured. x and y are obtained from the tristimulus values according to the following formulae for each of points which are on the same line parallel to the light source at a varied distance from the light source and dividing the line into 10 equal portions, to obtain a respective average for each distance, and the maximum and the minimum of the x and y coordinate values are obtained. The x coordinate value is preferably not higher than 0.345, still preferably not higher than 0.340, and the y coordinate value is preferably not more than 0.365, still preferably not more than 0.360. An average of the luminance was obtained.

$$x = \frac{X}{X+Y+Z}$$

$$y = \frac{Y}{X+Y+Z}$$

Abbreviations used in Examples and Comparative Examples have the following meanings.

MMA: Methyl methacrylate

MA: Methyl acrylate

DBPMS: 1,1-Di-t-butylperoxy-3,3,5-trimethylcyclohexane n-OM: n-Octylmercaptan

EB: Ethylbenzene

StOH: stearyl acrylate

EXAMPLE 1

A monomer solution consisting of 80.3% by weight of MMA, 4.7% by weight of MA, and 15% by weight of EB was treated to reduce the dissolved oxygen to 1 ppm or less and filtered through a filter having a pore size of 0.5 μm or smaller. To the monomer solution were added 150 ppm of DBPMS and 1500 ppm of n-OM and uniformly mixed. The resulting solution was continuously fed to a 10 l-volume closed system pressure reactor, polymerized at an average temperature of 130° C. for an average residence time of 2 hours while stirring, and continuously discharged into a reservoir connected to the reactor. After the volatile matter was removed under given conditions, 1300 ppm of glycerol monostearate and 1000 ppm of StOH were added thereto. The resin composition was continuously fed to an extruder in a molten state and pelletized to obtain a methacrylic resin composition. The pellets had a $_\eta$SP/C (reduced viscosity) of 53 ml/g, an HDT of 95° C., and an MFI of 6.5 g/10 min, comprised 94.5 wt % of an MMA unit and 5.5 wt % of an MA unit, and had a volatile content of 2500 ppm. A light conducting plate was prepared using the pellets, and the light conducting plate was assembled into a surface lighting unit by the method described in (9) above. The luminance and chromaticity coordinates x and y of the light emitting surface were measured by the method described in (10) above. The release force was measured by the method of (6). The results obtained are shown in Table 2 below.

EXAMPLE 2

A monomer solution consisting of 83.3% by weight of MMA, 1.7% by weight of MA, and 15% by weight 6f EB was treated to reduce the dissolved oxygen to 1 ppm or less and filtered through a filter having a pore size of 0.5 μm or smaller. To the monomer solution were added 150 ppm of DBPMS and 2350 ppm of n-OM and uniformly mixed. The resulting solution was continuously fed to a 10 l-volume closed system pressure reactor, polymerized at an average temperature of 130° C. for an average residence time of 2 hours while stirring, and continuously discharged into a reservoir connected to the reactor. After the volatile matter was removed under given conditions, 1300 ppm of glycerol monostearate and 1000 ppm of StOH were added thereto. The polymer was continuously fed to an extruder in a molten state and pelletized to obtain a methacrylic resin composition. The pellets had a $_\eta$SP/C of 44 ml/g, an HDT of 100° C., and an MFI of 5.5 g/10 min, comprised 98.1 wt % of an MMA unit and 1.9 wt % of an MA unit, and had a volatile content of 2500 ppm. The pellets were tested for evaluation in the same manner as in Example 1. The results obtained are shown in Table 2.

EXAMPLE 3

Pellets of a methacrylic resin composition was prepared in the same manner as in Example 2 except for changing the amount of glycerol monostearate to 500 ppm and feeding 1500 ppm of MMA to the extruder from a feed throat at a constant rate. The pellets had a $_\eta$SP/C of 42 ml/g, an HDT of 100° C., and an MFI of 5.6 g/10 min, comprised 97.9 wt % of an MMA unit and 2.1 wt % of an MA unit, and had a volatile content of 3600 ppm. The pellets were dry blended with 0.1 ppm of the above exemplified 4,4'-bis(5-methyl-2-benzoxazolyl)stilbene (WHITEFLOW HCS, produced by Sumitomo Chemical Co., Ltd.) as a wavelength converting agent. The resulting compound was tested for evaluation in the same manner as in Example 1. The results obtained are shown in Table 2.

EXAMPLE 4

Pellets of a methacrylic resin composition was prepared in the same manner as in Example 1 except for replacing glycerol monostearate with 1300 ppm of lauric acid. The pellets had a $_\eta$SP/C of 53 ml/g, an HDT of 95° C., and an MFI of 6.6 g/10 min, comprised 94.5 wt % of an MMA unit and 5.5 wt % of an MA unit, and had a volatile content of 4200 ppm. The pellets were dry blended with 0.5 ppm of a wavelength converting agent WHITEFLOW HCS. The resulting compound was tested for evaluation in the same manner as in Example 1. The results obtained are shown in Table 2.

COMPARATIVE EXAMPLE 1

Pellets of a methacrylic resin composition were prepared in the same manner as in Example 1 except that the monomer solution was not subjected to the treatment for dissolved oxygen reduction nor filtration. The pellets had a $_\eta$SP/C of 53 ml/g, an HDT of 95° C., and an MFI of 6.5 g/10 min, comprised 94.5 wt % of an MMA unit and 5.5 wt % of an MA unit, and had a volatile content of 2700 ppm. The pellets were tested for evaluation in the same manner as in Example 1. The results obtained are shown in Table 2.

COMPARATIVE EXAMPLE 2

Pellets of a methacrylic resin composition were prepared in the same manner as in Example 1 except that the removal of volatile matter from the polymer was conducted for an extended period of time. The pellets had a $_\eta$SP/C of 54 ml/g, an HDT of 95° C., and an MFI of 6.6 g/10 min, comprised 94.5 wt % of an MMA unit and 5.5 wt % of an MA unit, and had a volatile content of 600 ppm. The pellets were tested for evaluation in the same manner as in Example 1. The results obtained are shown in Table 2.

COMPARATIVE EXAMPLE 3

Pellets of a methacrylic resin composition was prepared in the same manner as in Example 2 except for feeding 4500 ppm of MMA to the extruder from a feed throat at a constant rate. The pellets had a $_\eta$SP/C of 44 ml/g, an HDT of 100° C., and an MFI of 5.5 g/10 min, comprised 97.9 wt % of an MMA unit and 2.1 wt % of an MA unit, and had a volatile content of 5900 ppm. The pellets were tested for evaluation in the same manner as in Example 1. The results obtained are shown in Table 2.

COMPARATIVE EXAMPLE 4

Pellets of a methacrylic resin composition was prepared in the same manner as in Example 1 except for adding 3000 ppm of glycerol monostearate and 6000 ppm of StOH and feeding 2000 ppm of EB to the extruder from a feed throat at a constant rate. The pellets had a $_n$SP/C of 53 ml/g, an HDT of 95° C., and an MFI of 6.6 g/10 min, comprised 94.5 wt % of an MMA unit and 5.5 wt % of an MA unit, and had a volatile content of 5800 ppm. The pellets were tested for evaluation in the same manner as in Example 1. The results obtained are shown in Table 2.

COMPARATIVE EXAMPLE 5

Pellets of a methacrylic resin composition was prepared in the same manner as in Example 1 except that no glycerol monostearate nor StOH was added and that 1500 ppm of 1-octanol was fed to the extruder from a feed throat at a constant rate. The pellets had a $_n$SP/C of 53 ml/g, an HDT of 95° C., and an MFI of 6.5 g/10 min, comprised 94.5 wt % of an MMA unit and 5.5 wt % of an MA unit, and had a volatile content of 3600 ppm. The pellets were tested for evaluation in the same manner as in Example 1. The results obtained are shown in Table 2.

COMPARATIVE EXAMPLE 6

The pellets obtained in Example 2 were allowed to absorb water under given conditions and then tested in the same manner as in Example 1. The results are shown in Table 2.

COMPARATIVE EXAMPLE 7

Pellets of a methacrylic resin composition was prepared in the same manner as in Example 2 except for changing the amount of n-OM to 4300 ppm. The pellets had a $_n$SP/C of 30 ml/g, an HDT of 100° C., and an MFI of 31 g/10 min, comprised 98.1 wt % of an MMA unit and 1.9 wt % of an MA unit, and had a volatile content of 2600 ppm. The pellets were tested for evaluation in the same manner as in Example 1. The results obtained are shown in Table 2.

COMPARATIVE EXAMPLE 8

The procedure of Example 4 was repeated except for changing the amount of WHITEFLOW HCS (wavelength converting agent) to 15.5 ppm. The results obtained are shown in Table 2.

COMPARATIVE EXAMPLE 9

Pellets of a methacrylic resin composition was prepared in the same manner as in Example 2 except for changing the amount of n-OM to 800 ppm. The pellets had a $_n$SP/C of 63 ml/g, an HDT of 100° C., and an MFI of 1.0 g/10 min, comprised 98.1 wt % of an MMA unit and 1.9 wt % of an MA unit, and had a volatile content of 2800 ppm. The pellets were tested for evaluation in the same manner as in Example 1. The results obtained are shown in Table 2.

TABLE 1

| | Volatile Component Fed to Extruder | | | |
|---|---|---|---|---|
| | Kind | b.p. (°C.) | SP [(cal/cm$^2$)$^{1/2}$] | Amount (ppm) |
| Example 1 | — | — | — | — |
| Example 2 | — | — | — | — |
| Example 3 | MMA | 100 | 8.6 | 1500 |
| Example 4 | MMA | 100 | 8.6 | 3000 |
| Comparative Example 1 | — | — | — | — |
| Comparative Example 2 | — | — | — | — |
| Comparative Example 3 | MMA | 100 | 8.6 | 4500 |
| Comparative Example 4 | EB | 136 | 8.8 | 2000 |
| Comparative Example 5 | 1-octanol | 195 | 10.3 | 1500 |
| Comparative Example 6 | — | — | — | — |
| Comparative Example 7 | — | — | — | — |
| Comparative Example 8 | — | — | — | — |
| Comparative Example 9 | — | — | — | — |

TABLE 2

| Example No. | Copolymer Composition MMA (wt %) | MA (wt %) | ηSP/C (ml/g) | Properties of Composition Foreign Matter[1] (g) | Release Agent[2] (part) | Volatile Content (ppm) | Water Content (ppm) | Amount of WHITEFLOW[3] | Silver Streaks[4] | Release Force (kgf) | Average Luminance (cd/m²) | Maximum (L) x | y | Minimum (S) x | y | (L)−(S) x | y |
|---|---|---|---|---|---|---|---|---|---|---|---|---|---|---|---|---|---|
| Example 1 | 94.5 | 5.5 | 53 | 3000 | (A) 0.13 (C) 0.10 | 2500 | 350 | 0 | A | 23 | 1296 | 0.339 | 0.358 | 0.335 | 0.354 | 0.004 | 0.004 |
| Example 2 | 98.1 | 1.9 | 44 | 2800 | (A) 0.13 (C) 0.10 | 2500 | 340 | 0 | A | 20 | 1290 | 0.340 | 0.359 | 0.335 | 0.355 | 0.005 | 0.004 |
| Example 3 | 97.9 | 2.1 | 42 | 3000 | (A) 0.05 (C) 0.10 | 3600 | 340 | 0.1 | A | 22 | 1323 | 0.338 | 0.355 | 0.336 | 0.353 | 0.002 | 0.002 |
| Example 4 | 94.5 | 5.5 | 53 | 2500 | (B) 0.13 (C) 0.10 | 4200 | 380 | 0.5 | A | 18 | 1330 | 0.336 | 0.351 | 0.335 | 0.350 | 0.001 | 0.001 |
| Compar. Example 1 | 94.5 | 5.5 | 53 | 6000 | (A) 0.13 (C) 0.10 | 2700 | 320 | 0 | A | 22 | black spots | | | | | | |
| Compar. Example 2 | 94.5 | 5.5 | 54 | 3200 | (A) 0.13 (C) 0.10 | 600 | 140 | 0 | C | 23 | unmeasurable | | | | | | |
| Compar. Example 3 | 97.9 | 2.1 | 44 | 3000 | (A) 0.13 (C) 0.10 | 5900 | 350 | 0 | C | 21 | unmeasurable | | | | | | |
| Compar. Example 4 | 94.5 | 5.5 | 53 | 2800 | (A) 0.30 (C) 0.60 | 5800 | 360 | 0 | C | 19 | unmeasurable | | | | | | |
| Compar. Example 5 | 94.5 | 5.5 | 53 | 2800 | (A) 0.00 (C) 0.00 | 3600 | 370 | 0 | C | 45 (warpage) | unmeasurable | | | | | | |
| Compar. Example 6 | 98.1 | 1.9 | 45 | 2800 | (A) 0.13 (C) 0.10 | 2500 | 1000 | 0 | C | 35 (warpage cracks) | unmeasurable | | | | | | |
| Compar. Example 7 | 98.1 | 1.9 | 30 | 3300 | (A) 0.13 (C) 0.10 | 2600 | 380 | 0 | A | 21 | unmeasurable | | | | | | |
| Compar. Example 8 | 94.3 | 5.7 | 53 | 3000 | (B) 0.13 (C) 0.10 | 4200 | 380 | 15.5 | A | 21 | 1204 | 0.335 | 0.350 | 0.329 | 0.343 | 0.006 | 0.007 |
| Compar. Example 9 | 98.1 | 1.9 | 63 | 3800 | (A) 0.13 (C) 0.10 | 2800 | 390 | 0 | A | 22 | 1248 | 0.362 | 0.373 | 0.346 | 0.355 | 0.016 | 0.018 |
| Example 9 | | | | | (C) 0.10 | | | | | | | | | | | | |

Note:
[1] Number of fine particles of foreign matter having a size of 0.5 to 2.5 μm per gram of the polymer.
[2] (A): Glycerol monostearate
(B): Lauric acid
(C): Stearyl alcohol
[3] Wavelength converting agent WHITEFLOW HCS
[4] The degree of silver streaks was graded as follows.
A . . . Acceptable
B . . . Slightly problematic
C . . . Very problematic

Possibility of Industrial Application

The specific methacrylic resin composition of the present invention provides a thin light conducting plate having a long light pass length which is free from optical defects, such as discoloration and luminance unevenness, by injection molding without being accompanied by molding faults, such as silver streaks and cracks or deformation on release from a mold. The light conducting plate of the invention provides excellent side-lighted surface lighting units.

It is surprising that addition of a wavelength converting agent to the methacrylic resin composition of the invention affords a side-lighted surface lighting unit having high light utilization and therefore exhibiting a high luminance and freedom from color unevenness and luminance unevenness. It seems that the effects are brought about by conversion of light components in the ultraviolet region which have not been utilized to light components in the visible region.

I claim:

1. A light conducting plate for back lighting, which comprises a methacrylic resin composition comprising:

100 parts by weight of a methacrylic copolymer resin comprising: 90 to 99.5% by weight of a methyl methacrylate unit; and 0.5 to 10% by weight of an alkyl acrylate unit containing 1 to 8 carbon atoms in the alkyl moiety thereof, and having a reduced viscosity of 35 to 60 ml/g in chloroform, wherein said methacrylic copolymer resin contains not more than 5000 fine particles having a particle size of 0.5 to 25 μm per gram, and 1000 to 5000 ppm of at least one volatile component having a boiling point of 80° to 150° C. at atmospheric pressure and a solubility parameter of 7 to 10 $(cal/cm^2)^{1/2}$;

0.01 to 0.2 part by weight of a glycerol higher fatty acid ester represented by formula (1):

wherein $R_1$ represents an alkyl or hydroxyalkyl group containing an odd number of carbon atoms of from 11 to 25; and $X_1$ and $X_2$ each represent a hydrogen atom or —C(=O)$R_1$, or of a higher fatty acid; and 0.01 to 0.5 part by weight of a higher aliphatic alcohol, said composition having a water content of 1 to 800 ppm, wherein the chromaticity of said light conducting plate has the difference between the maximum and the minimum of x and y color coordinates of the light emitting surface of from 0.001 to 0.005 as obtained according to JIS-Z-8701.

2. The light conducting plate for back lighting according to claim 1, wherein said methacrylic copolymer resin further contains 0.1 to 10 ppm of a wavelength converting agent added thereto.

3. The light conducting plate for back lighting according to claim 2, wherein said wavelength converting agent is at least one member selected from the group consisting essentially of a bisbenzoxazole compound, a pyrazoline compound, a coumarin compound, an imidazolone compound, a benzidine compound, a naphthalimide compound, and a diaminostilbenedisulfonic acid compound.

4. The light conducting plate for back lighting according to claim 1, wherein said glycerol higher fatty acid ester is represented by formula (1) wherein $X_1$ and $X_2$ both represent a hydrogen atom and the ratio of an alkyl moiety having 17 carbon atoms to the total alkyl moieties is 80 to 99%.

5. The light conducting plate for back lighting according to claim 1, wherein said higher fatty acid is from 0.01 to 0.2 parts by weight of lauric acid and said higher aliphatic alcohol is from 0.01 to 0.5 parts by weight of stearyl alcohol.

* * * * *